Nov. 24, 1970 R. L. ADAMS, JR., ETAL 3,543,242

MULTIPLE LEVEL PRIORITY SYSTEM

Filed July 7, 1967 2 Sheets-Sheet 1

INVENTORS
ROBERT L. ADAMS, JR
GERALD W. KURTZ

BY Earl C. Hancock

ATTORNEY

MULTIPLE LEVEL PRIORITY SYSTEM

Filed July 7, 1967 2 Sheets-Sheet 2

United States Patent Office 3,543,242

Patented Nov. 24, 1970

3,543,242

MULTIPLE LEVEL PRIORITY SYSTEM

Robert L. Adams, Jr., Kingston, and Gerald W. Kurtz, Saugerties, N.Y., assignors to International Business Machines Corporation, Armonk, N.Y., a corporation of New York Filed July 7, 1967, Ser. No. 651,739
Int. Cl. G06f 9/18
U.S. Cl. 340—172.5 16 Claims

ABSTRACT OF THE DISCLOSURE

In a device for handling a plurality of electronic signals representing requests for servicing, multiple service request type input signals are honored based upon both an assigned priority list and the time of arrival of such requests. Request signals received during a first time period are temporarily stored and serviced as a group based upon the preassigned list. Later received request signals are likewise stored and serviced as a second group based upon the same preassigned lists. Means are provided to permit high priority overriding of the usual request servicing for handling low frequency service requests involving potential overrun conditions.

CROSS REFERENCES TO RELATED APPLICATIONS

Application Serial No. 651,795, "Variable Duration Scan" by Robert L. Adams, filed concurrently with this application and having the same assignee as this application.

Application Serial No. 467,944, "Communication Line Priority Servicing Apparatus," by L. T. O'Connor, Jr. and W. H. Richard, filed June 29, 1965 now U.S. Patent No. 3,353,162 issued Nov. 14, 1967 and having the same assignee as the present application.

BACKGROUND OF THE INVENTION

Field of the invention

The present invention rleates to electronic devices for handling a plurality of input signals each of which represents a request for servicing. More particularly, the present invention relates to electronic devices for ensuring that servicing of all requests for service into a shared common device is accomplished based upon a preassigned order of priority as well as the time of arrival of the requests. The present invention is particularly useful for a computer environment wherein a plurality of devices such as multiple processor elements and communication controlling devices may require access to a common device such as a storage unit.

Description of the prior art

Several systems have been developed for the purpose of servicing a plurality of service request type input signals in the data processing and/or data communications art. For instance, a communication control unit may be required to handle requests for servicing from a multiplicity of communication lines. Typically, these requests are handled on a simple sequential basis wherein the first request in a series is honored. In one form, the multiplicity of requests are serviced by scanning starting with the first of an arbitrary sequence of the requests until an outstanding request is identified and honored. If another request appears after honoring the identified request, the scan will continue to the next request in this arbitrary list until a complete cycle of servicing is accomplished before returning to the initial requests. With such a system, a device producing two consecutive requests without any competing request might have to wait while the device completed two full cycles of scanning before its requests would be serviced.

Another system is to scan all requests starting from the highest listed request whenever any request is received and, after that request is honored, to start the scan once again from the highest priority request if any request is still outstanding. Thus, a device which happened to be high in the priority list conceivably could block any communications from the lower priority device even though they may be of coordinate importance.

Some data communications apparatus has a relatively low frequency of service request generation but must be serviced rapidly when these requests are received. For instance, a drum data storage apparatus might require a relatively long period of time to retrieve data but, once retrieved, may have to have that data accepted by the communications line before the next sequence of data was to be read from the drum since buffering between the drum and communications might only allow for a limited storage of data. Thus, although the drum would require relatively infrequent servicing, servicing must be promptly provided when it is needed. An arrangement for providing a forced higher priority for such devices is shown in the aforementioned U.S. Patent No. 3,353,167 by O'Connor et al. which relates to a recirculating delay line type of data communication servicing arrangement.

None of the known devices in the multi-element computer art have the capability of ensuring that all service requests which might be of relatively equal importance for priority purposes are given an opportunity to be serviced within a group of such requests based upon time of occurrence. This type of servicing is particularly desirable where two or more groups of service requests must be serviced wherein one group of requests might have a higher preference relative to the other group but it is desirable to permit honoring of all requests in both groups in a given time period or scan window. That is, there is no known prior art which provides equal opportunities for honoring all service requests appearing in two or more groups in a given time period and at the same time providing servicing of all requests in both groups in accordance with a predetermined order. Still further, no known prior art devices provide such servicing with an ability to override the existing list and group service scanning for higher priority requests.

BRIEF SUMMARY OF THE INVENTION

By means of the present invention, the first of a multiplicity of service request signals initiates the operation of the circuitry designed to dedicate handling of any requests. This initiation can be either directly from the service request itself or can be from the output of a plurality of latches, the first of which is set by the initial service requests. If no other service request signals appear before the handling of the initial requests is started, then this initial request will be processed to the exclusion of the others. However, if one or more additional service requests appear before the initial request is honored, these requests will each set an appropriate latch of a series of first level latches. These initial first level latches will in turn set second level latches, one for each service request, which ultimately will block any further setting of second level latches. By tiebreaking circuitry, the service requests will then be honored for the device assigned the highest priority in that group. However, the second level latches that were originally set will not be reset until all of them have been honored. That is, after the highest priority of the second level latches has been serviced, the next level priority of second level latches that are set will be serviced and so forth until all second level latches have been reset. Any subsequently appearing service requests will have set their first level latches and will, in a sense, be awaiting completion of servicing of all second level latches before they will be allowed to set their second level latches for a service cycle. The setting of a second level latch thus permits the device that originated the request an opportunity to compete for servicing all requests appearing in a given period of time.

Another feature of the present invention is that each of a first group of service requests which have set their second level latches can be serviced with a higher priority than yet a second group of service requests which have also set their second level latches, the second group being serviced in accordance with its own priority list immediately after the honoring of all second level requests in the first group. Thus, all of the first group of service requests can be assigned servicing for their second level latches in preference to the servicing of requests which are set for second level latches in the second group, this being accomplished by means of the tiebreaking circuitry.

In one embodiment of the present invention, a service request signal can be honored immediately if there are no first or second level latches set thus increasing the response time of the circuitry to such a request.

In yet another feature of the present invention, a given service request signal can include an additional signal which indicates that it must be honored with an absolute higher priority. This could be associated with the type of device that could overrun and lose data if a service request were not honored immediately. The circuitry in this feature permits the immediate competing of the service requests with all other service requests that have been accepted.

Accordingly, it is a primary object of the present invention to provide multi-level servicing of a plurality of service request type signals.

Another object of the present invention is to provide multiple level service request servicing based upon a physically oriented priority as well as a time of occurrence of the request.

Still another object of the present invention is to permit honoring of service requests so that all service requests occuring within a first time period will be honored before any service requests occuring during a later time period are serviced.

Yet another object of the present invention is to provide an arrangement for permitting a device requiring a special high priority servicing to immediately compete for servicing.

The foregoing and other objects, features and advantages of the present invention will be more apparent from the following particular description of the preferred embodiments as illustrated in the accompanying drawings in which.

The following description of the preferred embodiments for the present invention is couched in terms of a multiprocessor, multicommunications channel configuration for controlling the honoring of storage cycle requests to a commonly shared storage unit. In the embodiment described, four communication channel control units are grouped as one series of service or storage cycle request signals and four processor elements are grouped for yet another storage cycle service request arrangement. However, it should be appreciated that the present invention is in no way limited to the particular devices or configurations shown and is adaptable to any arrangement where groups of services are to be honored on priority lists and time of occurrence basis. It should be noted in FIG. 1 that heavy lines indicate multiple parallel signal paths while the lighter lines generally indicate single signal paths.

Figure 1:
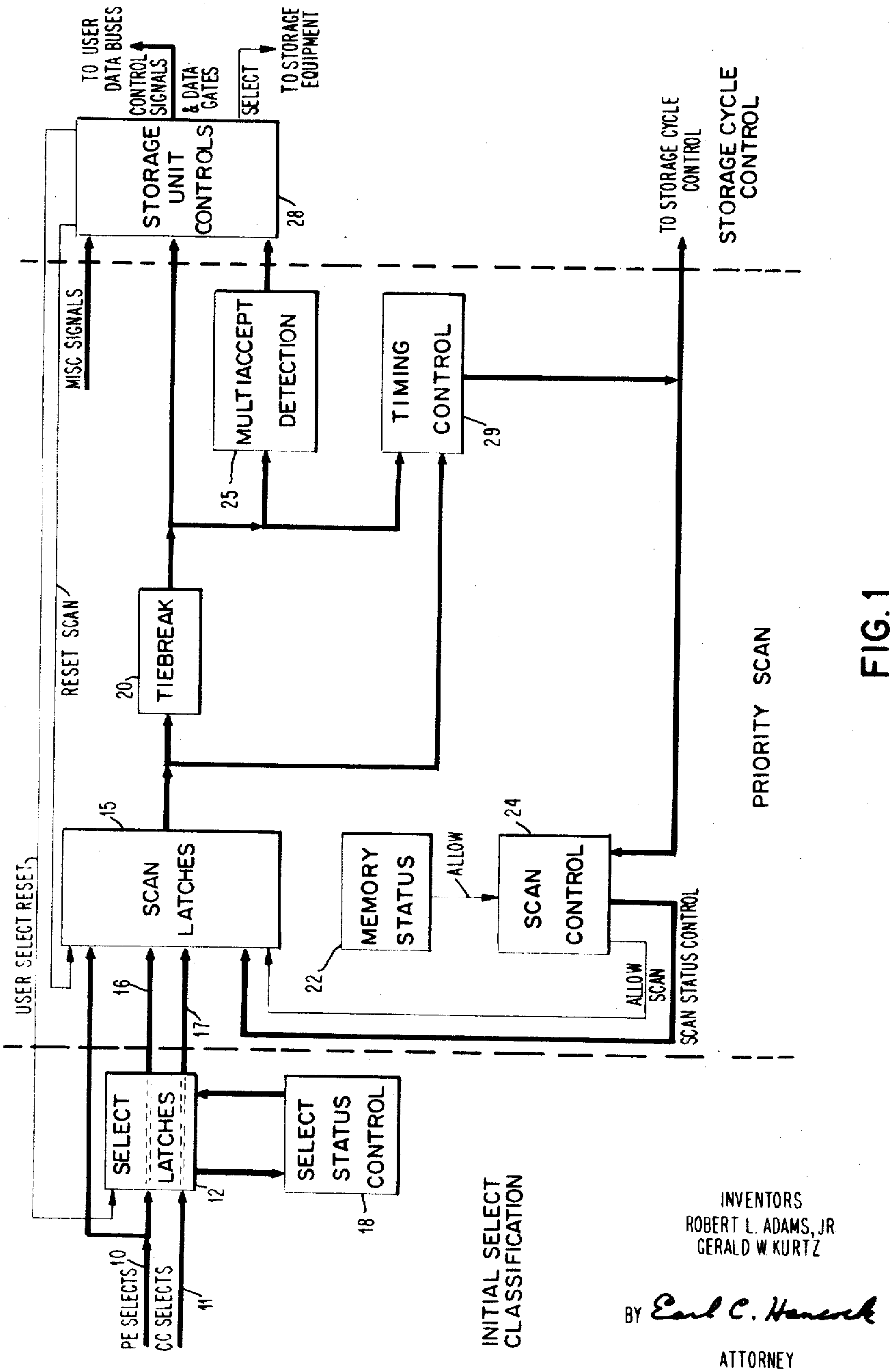
FIG. 1 is a generalized block diagram of the present invention particularly showing its association with computer related components.

FIG. 1 shows an overall block diagram of priority servicing on a multi-level basis in accordance with the present invention which is intended for the purpose of allowing any of a plurality of processor elements or central processor units (PE) or any of a multiplicity of communication channel control units (CC) to obtain storage cycles to a commonly shared storage unit. In FIG. 1, the priority select and control circuits according to the present invention establish priority for storage select signals from up to eight hours, both PE and CC, and generate control and data gate signals based on an honored select signal. Each select signal is honored or granted a storage cycle in accordance with the priority scheme of the priority select and control circuits. In general the priority scheme is designed to honor select signals based upon (1) the arrival time of the select signal and (2) the relative importance of the select signal with respect to other user select signals. In addition, the priority scheme awards storage cycles in a manner that permits maximum access to storage.

Logic operations of the priority select and control circuits are centered around three major functions as is shown in FIG. 1: (1) initial select classification, (2) priority scan, and (3) storage cycle control. Initial select classification circuits assign priority levels to each user select signal based on the signal arrival time, the type of user supplying the select signal and the type of select signal received from the user. Priority scan circuits examine the initial select classification before award of each storage cycle and determine which user is to be awarded the cycle. Upon completion of a priority scan, the storage cycle control circuits initiate a storage cycle and generate control and data gate signals throughout the cycle.

Initial select classification of PE select signals appearing on lines 10 and CC selects on lines 11 is performed by the select latches 12 and select status control logic 18. Although different classifications are awarded CC and PE users, the overall scheme for awarding these classifications is similar although a CC user may supply high priority select signals which will be described in greater detail hereinafter. Within the CC and PE user groups, assignment of initial select classifications by select latches 12 for a particular user select signal is further dependent upon the status of classification previously awarded other user select signals. Within the CC user group, an additional consideration in awarding initial select classification is necessary when a user supplies a high priority select signal. Since a CC user high priority select signal implies that the request is of an urgent nature, other considerations such as arrival time and the status of those select signals are generally ignored and the highest initial select classifications is automatically awarded. An initial select signal is generally awarded a relatively low priority classification and subsequent upgrading of classifications occur in various ways and is primarily dependent upon the comparative status of other select classifications as will be more apparent in the description for FIG. 2.

The initial select classification assigned to select signals will produce the outputs on lines 16 and 17 to permit the priority scan circuits by means of scan latches 15 to enter only the highest award classification in the competition for the next storage cycle. The tiebreaking circuitry 20 can be arranged to process all classified CC select signals before any classified PE select signals are reached. Storage unit control circuits 28 generate timed signals to control data flow between storage and the user granted the storage cycle as well as supplying timed signals to prepare the initial select classification and priority scan circuits for the next priority scan, this being performed in conjunction with time control 29. At the storage control circuits 28, the winning select signal from the tiebreak logic 20 initiates a storage cycle by causing the winning select signal to be issued to storage. In storage, the winning select signal starts the appropriate storage operation. Timing signals are also generated by the storage control circuits 28 and are used to gate data from and to the selected user during the storage cycle. At specified times during the storage cycle, the storage cycle control circuits 28 furnish a user select latch reset signal and a scan latch reset signal. The user select latch reset signal resets the select latches representing the user which won the storage cycle in progress. The scan latch reset signal resets all scan latches to prepare for the next priority scan. Miscellaneous controls, such as the master reset signal, are also recognized and processed by the storage cycle control circuits 28.

As mentioned, the processor element (PE) select or service request signals are introduced to the system over lines 10 while the channel controller (CC) selects or service requests are introduced over lines 11. All of the select signals whether they be PE or CC are introduced to a plurality of select latches 12, the purpose of which is to classify the select signal for processing in allowing scan cycles. The PE selects 10 are also directly connected to scan latches 15 to permit the processor elements to acquire a storage cycle on a minimized time delay basis if there are no classified select signals being produced by latches 12. That is, if only one processor element is requesting a storage cycle and there are no other PE or CC select signals present, the assigning of a storage cycle can immediately commence through scan latches 15.

However, if a CC select or more than one PE select is present at the input for latches 12, these requests will be classified by these latches which will produce appropriate signals to the scan latches 15 over cables 16 for PE units and 17 for CC units. The select status control 18 will determine which of the classified PE and CC selects will be allowed to pass through select latches 12 to output lines 16 and 17 in order to compete in scan latches 15 for the assignment of a storage cycle. That is, control 18 will ensure that the select signal appearing during a first time period are permitted via lines 16 and 17 to set their appropriate scan latches 15 for processing and all subsequently received selects will be stored to be later permitted to compete for a storage cycle.

In the event that more than one select latch 12 has been set providing inputs to scan latches 15, tiebreaking circuitry 20 will determine which of these select signals that has been permitted to compete will actually be assignal the next storage cycle. Of course, if a storage cycle is in process, no select signal can be premitted. Thus, memory status circuit 22 provides an "allow" output signal when a storage cycle is available to scan control circuitry 24. When the allowed signal is received, scan control 24 will generate an "allow scan" signal to the scan latches to permit the tiebreaking circuit 20 to have an input.

If a malfunction should occur in tiebreaking circuitry 20, it is possible that signals could be produced indicating that more than one select signal is to be honored. However, multi-accept detection circuit 25 would recognize such an occurrence and would provide an input signal to storage unit controls 28 to indicate that such an error had occured. This would result in resetting of all scan latches 15 and another attempt to determine a tiebreak winner. If a second tiebreak effort is attempted and a multi-accept condition is detected again by 25, a system error signal would be generated by circuitry not shown.

After a storage cycle has been granted to a particular select input, storage unit control 28 would provide reset signals both for the scan latches in 15 and the select latch in 12 for the honored select so that other units would then compete. If after one request signal has been serviced there is still a pending classified output on line 16 or line 17 or both, a new scan will be dedicated to servicing those pending requests. The next select which is processed will have its latches in 12 and 15 reset and the device will determine whether or not there are still pending classified requests on 16 and 17. This action will continue until all such requests have been serviced. At that time, any pending requests which have been stored in latch 12 but which have not been permitted to provide outputs at 16 and 17 will be classified and allowed to compete for storage cycles.

The control signals and data gates supplied to control the data busses and the select signal provided to the storage equipment along with the output of timing control 29 are simply for the purpose of usual control of storage cycle operations and will not be discussed herein in the interest of brevity. However, these operations are well understood by those having normal skill in the art.

Figures 2, 3:
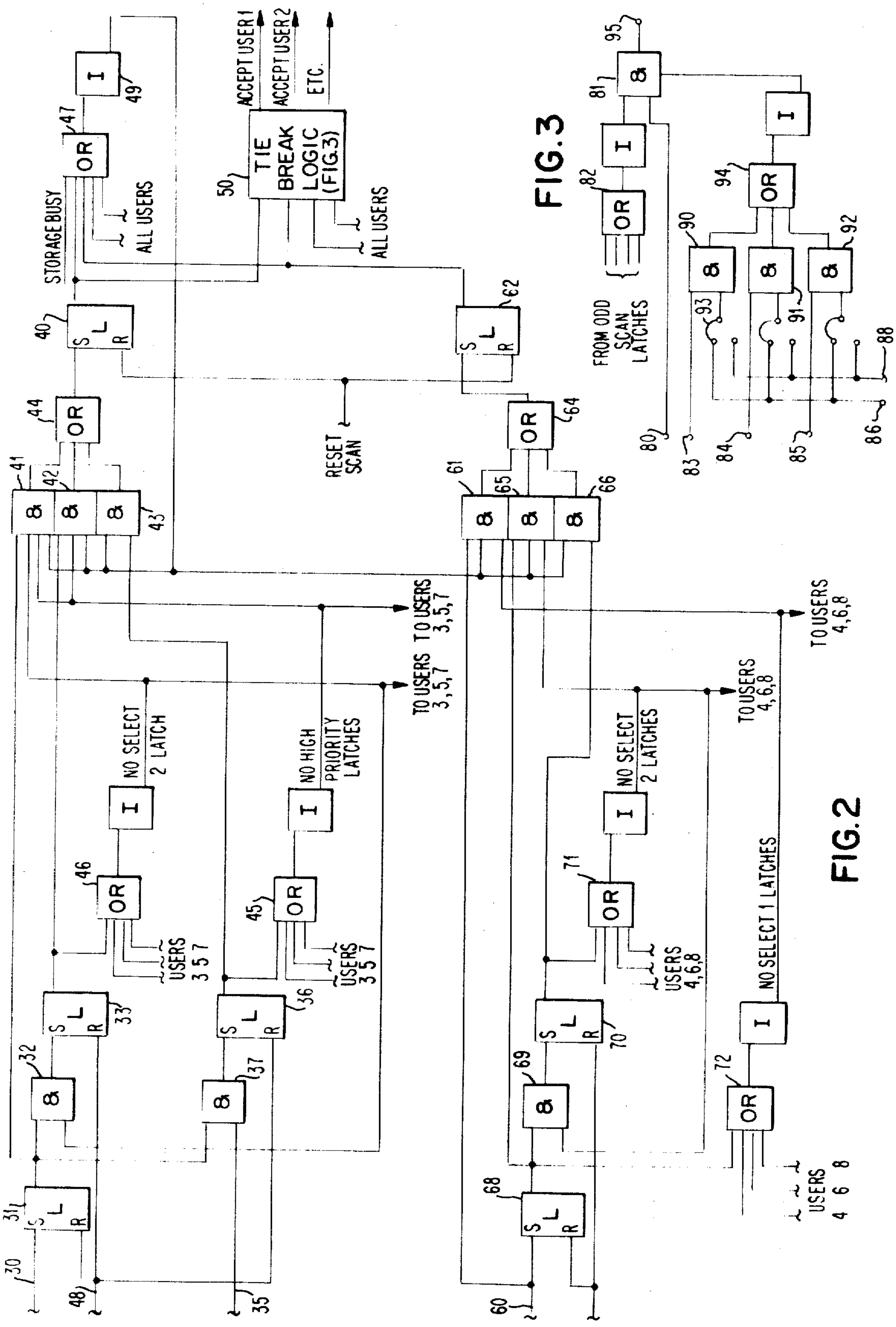
FIG. 2 is a schematic diagram of a service request servicing circuitry in accordance with the present invention.
FIG. 3 is a circuit diagram of a tiebreaking circuit which would be utilized in conjunction with the FIG. 2 circuitry.

The circuitry in accordance with FIG. 2 has been designed to assign storage cycles to two groups of asynchronously requesting devices on the following basis: One group having priority over another, priority of the devices within a group and waiting time of devices within a group. The two major groups are defined as odd users, those assigned numbers 1, 3, 5 and 7 which typically would be the channel control units mentioned in conjunction with FIG. 1, which have priority over the even users which are those assigned numbers 2, 4, 6 and 8 and typically would be the processor element or PE units mentioned in FIG. 1. Within the odd grouping there is a subgroup of users who may have a high priority select capability. Priority within the odd and even groups is hard wired on a 1, 2, 3, etc. basis, but is manually changeable. Within the odd user group, a high priority select or storage request causes that user to receive the highest level of priority regardless of the hard wired priority. Of course, if more than one high priority select occurs at any one time, the decision would then be based on the hard wired priority.

In addition, within the odd and even groups, storage cycles are assigned on a first-in basis when the time difference between select or storage requests is greater than three circuit delays and the high priority condition is not present for the odd user group.

The assignment of a storage cycle requires two levels of decision. The first results in setting the user's scan latches and the second in the output of the tiebreaking logic.

FIG. 2 illustrates the particular logic circuitry which would be utilized for one odd select signal and none even select signal. Although the details of logic design for odd users 3, 5 and 7 and even users 4, 6 and 8 are not shown, the logical connections for these users are shown and it is to be understood that users 3, 5 and 7 have particular circuitry analogous to that shown for user 1, while users 4, 6 and 8 have circuitry analogous to that shown for user 2. Initial consideration will be of the operation which results in the setting of the odd user scan latches. The incoming select signal on line 30 will set select one latch 31 (i.e.: the initial or first level select latch 31). Assuming that AND circuit 32 is conditioned, the setting of select one latch 31 results in the setting of the second level select latch 33. That is, latch 33 would be set through AND 32 as long as another odd select signal had not resulted in the setting of its second level or select two latch for a minimum of three circuit delay times prior to this time.

A high priority select arriving on line 35 in conjunction with the appearance of a select signal on line 30 will result in the setting of high priority latch 36. This would result from the fact that the appearance of a select signal at line 30 and the setting of latch 31 would condition AND circuit 37 to permit the setting of latch 36.

The user who provides the select input at lines 30 will be permitted to compete for assignment of a storage cycle whenever its scan latch 40 has been set. The actual control for the setting of scan latch 40 is provided by the output of any one of three AND circuits 41, 42 or 43 through OR circuit 44. AND circuit 41 would be conditioned by the setting of select one latch 31, the absence of any odd user second level or select two latch being set, the absence of a high priority latch being set and an allow scan timing level being received from OR 47 and invert circuit 49. That is, any select two latch being set among the odd users would decondition AND 41 so that no select one latch would be permitted to compete with a set select two latch among that group of users. It should be noted that the setting of high priority latch 36 which must pass through OR circuit 45 is sufficient time delay to permit AND 41 to still be conditioned when latch 31 is set so that its scan latch 40 could be initially set if there were no other high priority latches set. AND circuit 42 is conditioned by second level latch 33 being on, no high priority select latch being on and the allow scan pulse being received. It should be noted that if any other select two latch is set by user 3, 5 or 7, AND 32 would be deconditioned and the setting of latch 31 would not result in the setting of second level latch 33. AND circuit 43 is conditioned by the setting of high priority latch 36 and the presence of an allow scan pulse. This permits the user presenting select 30 to set his scan latch 40 and immediately compete with the other scan latches that are set for a storage cycle regardless of whether or not second level latch 33 has been set. Once a second level latch 33 has been set, the output of OR circuit 46 will decondition AND circuits similar to AND 32 for users 3, 5 and 7. Thus, if a signal is produced on 30 which sets latches 31 and 33 before any other of users 3, 5, or 7 has had time to set user providing user 1 select signals would be competing for a scan cycle and thus would be awarded priority in its group, this being presumed that no high priority signal occurs in the meantime.

After user 1 has been awarded a storage cycle, a reset signal for this user will be generated by the storage control unit on line 48 which will result in the resetting of latches 31, 33 and 36. A similar reset signal would be generated to reset scan latch 40.

Thus, AND circuits 41, 42 and 43 and their counterparts for users 3, 5 and 7 control the setting of the scan latches for the particular user on the basis of the presence of a high priority select, a second level or select two latch being set or only a first level or select one latch being set. Select signal arriving within a time period of approximately three circuit delays may result in the setting of more than one scan latch and this requires the resolution through tiebreak logic 50. An arrangement for minimizing the time delay involved in resolving a tie and closing of the scan window (i.e.: deconditioning AND's 41–43, 61, 65, and 33) is described in the copending application entitled "Variable Duration Scan" by Robert L. Adams, Jr.

The even user logic operates in a similar manner with two exceptions; there is no high priority select capability but there is a direct path for the incoming select to the scan latch. That is, if user 2 provides a select signal on line 60 and no other select signal has been received from another even user, AND circuit 61 would be conditioned and would set scan latch 62 through OR circuit 64. This would permit user 2 to immediately compete for a storage cycle and provide a fast response in the event that the storage was idle. AND circuits 61, 65 and 66 control setting of the scan latch 62 based on the level of the select signals. That is, within the even user group, the settting of latch 62 depends upon whether any second latch is set, whether any first level latch is set with no second level latches set or whether only a raw select signal has been received. As before, simultaneous select signals may result in more than one scan latch being set so that a competition for the assignment of a storage cycle will be determined by tiebreaking circuitry 50.

It should be understood that each of users 4, 6 and 8 have first level select latches such as latch 68 and second level select latches such as latch 70 which are shown for user 2. In addition, there is a high priority latch for each applicable odd user which is not shown for the even users. The presence of a signal on 60 will result in first level latch 68 being set and, if no other user has set the second level latch, will result in latch 70 being set for a second level latch or select two latch since AND 69 will be conditioned. If no other second level or select two latch is set, AND 65 will be conditioned and scan latch 62 will be set. However, if another select one latch has been set so that AND's 61 and 65 are deconditioned, but AND 66 has not yet been deconditioned, the setting of select two latch 70 will also result in the setting of latch 62 to permit user 2 to compete for a storage cycle. Thus, the inputs for OR circuit 71 are the output of all select two latches for the users 2, 4, 6, or 8 and the inputs for OR circuit 72 are the outputs of all select one latches for users 2, 4, 6 or 8.

The allow scan line is a timing control signal for setting of the scan latches to permit the conditioning of the various AND circuits such as 41–43, 61, 65 and 66. The allow scan line through OR 47 and Invert 49 is conditioned when the storage control unit signals that it is not busy and is deconditioned three circuit delays after setting of any of the scan latches. After the scan latches have resolved, the tiebreak logic 50 makes the final decision as to which user should get the next storage cycle. The only criteria at this level is odd users have priority over even users and then the highest priority user within that particular group is assigned. Thus, all odd users who have set their scan latches such as 40 will be serviced before any even user scan latches such as 62 will be serviced. However, assuming that the scan cycle is servicing second level or select two latch settings, all of both the odd and even scan latches that have been set will be serviced before the select one latches for either group will be permitted to select their select 2 latches and compete for the next storage cycle. It should be noted that the setting of any scan latch in either group in the embodiment shown in FIG. 2 is dependent upon factors within the appropriate group only. Thus, second level latches set in the odd group (i.e.: latches such as 33) may be competing with directly set scan latches in the even group (i.e.: the setting of latch 62 from an AND 61 output). However, it should be apparent that conditioning levels from one group can be coupled to control competition from the other group. For instance, the outputs of high priority latches such as 36 can be coupled to decondition all even user AND circuits such as 61, 65 and 66.

Upon completion of the scan and the servicing of one of the select signals, all scan latches are reset by the reset scan input signal from the storage control unit and in addition the select latches are reset for the user who receives the prior storage cycle. This permits the servicing of all outstanding select two latches and high priority latches that have been set.

FIG. 3 illustrates a typical tiebreaking logic circuitry particularly with respect to user 2, the user providing a select or service request signal on line 60 of FIG. 2 which resulted in the setting of scan latch 62. The output of scan latch 62 is connected to input terminal 0 of FIG. 3 to provide one conditioning level for AND circuit 81. As mentioned before, all of the scan latches set for the odd users 1, 3, 5 and 7 will be serviced in preference to those serviced for the even scan latches. Thus, the setting of any odd scan latch such as 40 in FIG. 3 for any of users 1, 3, 5 or 7 will provide an input to OR circiut 82 which would decondition AND circuit 81. However, assuming that there are no odd scan latches set, the other scan latches of the even group will provide their inputs at terminals 83, 84 and 85.

A constant inhibit level is introduced to terminal 86 and a second conditioning level is introduced to terminal 88. It is assumed that user 2 is to be granted the highest priority among the even users. Thus, each of AND circuits 90, 91 and 92 will have a jumped connection such as 93 to inhibit line 86. Thus, a setting of a scan latch for a lower priority user, in this case, user 4, 6 or 8, will not produce an output from any of AND circuits 91–92, and as a result, there will be no output from OR circuit 94 and AND circuit 81 will be continuously conditioned.

Thus, if there are no odd scan latches set, and all jumpers for AND circuits 90–92 are set as shown, AND circuit 81 will be conditioned so that the setting of a scan latch for user 2 will result in a signal at line 80 thereby providing an output at terminal 95. This output indicates to the storage unit controls that user 2 is to be accepted and granted a storage cycle. Similar such circuitry would be utilized for the odd scan latches. It should be noted that, if user 4 were to be granted the highest priority amongst the even group, jumper 93 would be changed to be connected to terminal 88 and thereby continuously condition one input to AND 90. Thus, if both scan latches for users 2 and 4 were set, AND 90 would produce an output which would decondition AND 81 thus blocking an assignment of a storage cycle to user 2 until a request for service from user 4 had been honored.

While the invention has been particularly shown and described with respect to the preferred embodiment thereof, it will be understood by those skilled in the art that many changes, modifications and the like in form and detail may be made therein without departing from the spirit and scope of this invention.

What is claimed is:

1. A device for awarding priority between a multiplicity of service request type input signals comprising (a) a plurality of input signal processing channels each including (1) a first storage means for providing an output indicative of the occurrence of a respective one of said input signals, (2) a second level latch, (3) first logic means for coupilng the said output of said one of said first storage means to the set input of said second level latch, (4) means for deconditioning said first logic means in response to the setting of any of said second level latches, (5) a scan latch, and (6) second logic means for setting said scan latch if said second level latch is set or if said one of said first storage means is producing an output and no said second level latch is set, and (b) means responsive to the setting of any one or more of said scan latches of said channels for sequentially honoring the service requests represented by said set scan latches in accordance with a predetermined order.

2. Apparatus in accordance with claim 1 wherein said first storage means are latches and said honoring means include means for clearing all said latches for said channel after the service request associated with the said channel has been honored.

3. Apparatus in accordance with claim 1 wherein said first storage means are first level latches and wherein at least one of said channels includes means for setting the said scan latch thereof into response to said input signal provided none of said first level latches and said second level latches have been set.

4. Apparatus in accordance with claim 1 wherein at least one of said channels includes input means for indicating that the service request associated therewith is to be given high priority servicing, said input means being coupled for setting the said scan latch of the said channel and for deconditioning all said second logic means thereby preventing any other said channel not having a similar said input means from setting the said scan latch thereof.

5. Apparatus in accordance with claim 3 wherein said channels are divided into first and second groups, each said channel of said second group including a said setting means, said honoring means being arranged for servicing all said scan latches set by said input signals for said first group before servicing any said scan latches set by said input signals for said second group.

6. A device for selectively servicing a multiplicity of service request input signals wherein said service requests are to be honored in accordance with a predetermined order comprising:

means simultaneously sensing for the occurrence of any said mutliplicity of service request input signals and producing preliminary initial classification signals corresponding to any said occurrences, means for producing higher initial classification signals in response to receipt of said preliminary initial classification signals, means responsive to said higher initial classification means for producing a control signal indicating the occurrence of any said higher initial classification signal, means coupled to said control signal producing means for selectively transferring any occurring said preliminary initial classification signals to said higher initial classification signal means in accordance with said control signal so that any preliminary initial classification signal occurring prior to the occurrence of said control signal is updated to a higher initial classification signal while any preliminary initial classification signal occurring after the occurrence of said control signal is inhibited from being updated to a higher initial classification signal, and means responsive to said initial classification signal producing means for selectively honoring said initial classification signals based upon said predetermined order.

7. A device in accordance with claim 6 wherein said honoring means includes means for permitting immediate honoring of a said service request input signal in the absence of any other said service request input signal.

8. A device in accordance with claim 6 wherein said honoring means includes means for permitting immediate honoring of said preliminary initial classification signal in the absence of any other said preliminary initial classification signal.

9. A device in accordance with claim 6 wherein said honoring means includes means for producing an output signal indicating the receipt of a said initial classification signal, means responsive to said output signal producing means for producing another control signal indicating the occurrence of any said output signal, means coupled to said another control signal producing means for selectively transferring said initial classification signals to said output signal producing means in accordance with said another control signal, and means for honoring said output signals in accordance with said predetermined order.

10. A device in accordance with claim 5 wherein said honoring means includes means for producing an output signal indicating the receipt of a said higher initial classification signal, means responsive to said output signal producing means for selectively transferring said higher initial the occurrence of any said output signal, means coupled to said another control signal producing means for selectively transferring said higher initial classification signals to said output signal producing means in accordance with said another control signal, means for honoring one of said output singals in accordance with said predetermined order, and means for controlling said output signal producing means and said initial classification means after honoring said one of said output signals to permit said output signal producing means to respond to any remaining said higher initial classification signals.

11. A device in accordance with claim 10 wherein said controlling means is effective after honoring a said output signal indicating the receipt of the last of said higher initial classification signals to permit said first mentioned transferring means to transfer any inhibited occurring preliminary initial classification signals to said higher initial classification means.

12. A device for selectively servicing in a predetermined order a multiplicity of service request input signals and high priority input signals associated with certain ones of said service request input signals, means responsive to any occurring said service request signals for producing preliminary initial classification signals, means for producing higher initial classification signals in response to receipt of said preliminary initial classification signals, means for producing highest initial classification signals in response to receipt of said preliminary initial classification signals and associated high priority input signals, means responsive to said higher initial classification means for producing a first control signal indicating the occurrence of any said higher initial classification signal, means responsive to said highest initial classification means for producing a second control signal indicating the occurrence of any said highest initial classification signal, means coupled to said first control signal producing means for selectively transferring any occurring said preliminary initial classification signal to said higher initial classification signal means in accordance with sad first control signal, and means responsive to said control signals and said initial classification signal producing means for selectively honoring said initial classification signals in accordance with said predetermined order.

13. A device in accordance with claim 12 wherein said honoring means includes means coupled to said first and said second control producing means to permit the transfer of any preliminary initial classification signal to said honoring means in accordance with said first and said second control signals.

14. A device in accordance with claim 12 wherein said honoring means includes means coupled to said second control signal producing means to permit the transfer of any higher initial classification signal to said honoring means in accordance with said second control signal.

15. A device in accordance with claim 12 wherein said honoring means includes means for transferring any highest initial classification signal to said honoring means regardless of the presence of any initial classification signal of lower rank.

16. A device for selectively servicing a first group of service request input signals and a second group of service request input signals, comprising:

means responsive to any occurring said service request signal of said first group for producing first preliminary initial classification signals, means responsive to any occurring said service request signal of said second group for producing second preliminary initial classification signals, means for producing first higher initial classification signals in response to receipt of said first preliminary initial classification signals, means for producing second higher initial classification signals in response to receipt of said second preliminary initial classification signals, means responsive to said first higher initial classification means for producing a first control signal indicating the occurrence of any said first higher initial classification signal, means responsive to said second higher initial classification means for producing a second control signal indicating the occurrence of any said second higher initial classification signal, means coupled to said first control signal producing means for selectively transferring any occurring said first preliminary initial classification signals to said first higher initial classification means in accordance with said first control signal, means coupled to said second control signal producing means for selectively transferring any occurring said second preliminary initial classification signals to said second higher initial classification means in accordance with said second control signal, and means responsive to all said initial classification signal producing means for selectively honoring any said initial classification signals of said first group before honoring any said initial classification signals of said second group.

References Cited

UNITED STATES PATENTS

| | | | |
|---|---|---|---|
| 3,353,160 | 11/1967 | Lindquist | 340—172.5 |
| 3,353,162 | 11/1967 | Richard et al. | 340—172.5 |
| 3,395,394 | 7/1968 | Cottrell | 340—172.5 |
| 3,395,398 | 7/1968 | Klein | 340—172.5 |
| 3,398,296 | 8/1968 | Sarati et al. | 340—172.5 X |

PAUL J. HENON, Primary Examiner

S. R. CHIRLIN, Assistant Examiner

PO-1050
(5/69)

UNITED STATES PATENT OFFICE
CERTIFICATE OF CORRECTION

Patent No. 3,543,242 Dated November 24, 1970

Inventor(s) Robert L. Adams, Jr. and Gerald W. Kurtz

It is certified that error appears in the above-identified patent and that said Letters Patent are hereby corrected as shown below:

Claim 1, Col. 9, line 32, "coupilng" should be ---coupling---.

Claim 2, Col. 9, line 50, after "for" (second occurrence), insert ---a---.

Claim 3, Col. 9, line 56, "into" should be ---in---.

Claim 5, Col. 10, line 5, after "any" insert ---of---.

Claim 8, Col. 10, line 36, after "of" insert ---a---.

Claim 10, Col. 10, line 53, "5" should be ---6---.

Claim 10, Col. 10, line 58, delete "selectively transferring said higher initial" and substitute therefor ---producing another control signal indicating---.

Claim 10, Col. 10, line 66, "singals" should be ---signals---.

Claim 12, Col. 11, line 32, "sad" should be ---said---.

SIGNED AND SEALED
MAR 9 1971

(SEAL)
Attest:

Edward M. Fletcher, Jr.
Attesting Officer

WILLIAM E. SCHUYLER, JR.
Commissioner of Patents